US009141938B2

(12) United States Patent
Goldberg

(10) Patent No.: US 9,141,938 B2
(45) Date of Patent: Sep. 22, 2015

(54) NAVIGATING A SYNCHRONIZED TRANSCRIPT OF SPOKEN SOURCE MATERIAL FROM A VIEWER WINDOW

(71) Applicant: Adam Michael Goldberg, San Francisco, CA (US)

(72) Inventor: Adam Michael Goldberg, San Francisco, CA (US)

(73) Assignee: TIGERFISH, San Francisco, CA (US)

( * ) Notice: Subject to any disclaimer, the term of this patent is extended or adjusted under 35 U.S.C. 154(b) by 272 days.

(21) Appl. No.: 13/664,353

(22) Filed: Oct. 30, 2012

(65) Prior Publication Data

US 2013/0054241 A1    Feb. 28, 2013

Related U.S. Application Data

(62) Division of application No. 12/127,635, filed on May 27, 2008, now Pat. No. 8,306,816.

(60) Provisional application No. 60/940,197, filed on May 25, 2007.

(51) Int. Cl.
*G10L 15/26*    (2006.01)
*G06Q 10/10*    (2012.01)

(52) U.S. Cl.
CPC .............. *G06Q 10/10* (2013.01); *G10L 15/26* (2013.01)

(58) Field of Classification Search
CPC ... G10L 15/26; G06Q 10/10; G06F 17/30017
USPC .......... 704/235, 270, 278; 715/723, 727, 203, 715/204
See application file for complete search history.

(56) References Cited

U.S. PATENT DOCUMENTS

| 5,623,681 | A  | * | 4/1997  | Rivette et al. .............. 715/255 |
| 6,332,147 | B1 | * | 12/2001 | Moran et al. ............... 715/203 |
| 6,369,835 | B1 | * | 4/2002  | Lin ........................... 715/726 |
| 7,096,416 | B1 | * | 8/2006  | Smith et al. ................. 715/203 |
| 7,236,932 | B1 |   | 6/2007  | Grajski |
| 7,376,561 | B2 |   | 5/2008  | Rennillo et al. |
| 7,444,285 | B2 |   | 10/2008 | Forbes |
| 7,559,033 | B2 | * | 7/2009  | Boss et al. .................. 715/769 |
| 7,617,445 | B1 | * | 11/2009 | Townsend et al. ........... 715/232 |
| 7,899,670 | B1 |   | 3/2011  | Young et al. |
| 7,974,715 | B2 |   | 7/2011  | Townsend et al. |
| 8,050,906 | B1 | * | 11/2011 | Zimmerman et al. ........... 704/2 |
| 8,306,816 | B2 | * | 11/2012 | Goldberg ..................... 704/235 |
| 8,762,834 | B2 | * | 6/2014  | Falk et al. ................... 715/255 |

(Continued)

*Primary Examiner* — Martin Lerner
(74) *Attorney, Agent, or Firm* — Michael A. Glenn; Perkins Coie LLP

(57) ABSTRACT

A method and system for producing and working with transcripts according to the invention eliminates time inefficiencies. By dispersing a source recording to a transcription team in small segments, so that team members transcribe segments in parallel, a rapid transcription process delivers a fully edited transcript within minutes. Clients can view accurate, grammatically correct, proofread and fact-checked documents that shadow live proceedings by mere minutes. The rapid transcript includes time coding, speaker identification and summary. A viewer application allows a client to view a video recording side-by-side with a transcript. Clicking on a word in the transcript locates the corresponding recorded content; advancing a recording to a particular point locates and displays the corresponding spot in the transcript. The recording is viewed using common video features, and may be downloaded. The client can edit the transcript and insert comments. Any number of colleagues can view and edit simultaneously.

14 Claims, 11 Drawing Sheets

(56) References Cited

U.S. PATENT DOCUMENTS

| | | | |
|---|---|---|---|
| 8,806,320 B1* | 8/2014 | Abdo | 715/203 |
| 8,972,841 B2* | 3/2015 | Glazer et al. | 715/203 |
| 2003/0046350 A1* | 3/2003 | Chintalapati et al. | 709/206 |
| 2003/0078973 A1* | 4/2003 | Przekop et al. | 709/204 |
| 2003/0101054 A1 | 5/2003 | Davis et al. | |
| 2003/0105631 A1 | 6/2003 | Habte | |
| 2004/0064317 A1 | 4/2004 | Othmer et al. | |
| 2005/0010407 A1 | 1/2005 | Jaroker | |
| 2005/0033753 A1* | 2/2005 | Mundell et al. | 707/100 |
| 2005/0080633 A1 | 4/2005 | Lueck et al. | |
| 2005/0102140 A1 | 5/2005 | Davne et al. | |
| 2005/0102146 A1 | 5/2005 | Lucas | |
| 2005/0137867 A1 | 6/2005 | Miller | |
| 2005/0154613 A1* | 7/2005 | Kade | 705/2 |
| 2005/0183031 A1* | 8/2005 | Onslow | 715/805 |
| 2006/0149558 A1 | 7/2006 | Kahn et al. | |
| 2006/0256933 A1* | 11/2006 | Wolfe et al. | 379/75 |
| 2007/0005616 A1 | 1/2007 | Hay et al. | |
| 2007/0016401 A1 | 1/2007 | Ehsani et al. | |
| 2007/0074116 A1* | 3/2007 | Thomas | 715/719 |
| 2007/0192107 A1* | 8/2007 | Sitomer et al. | 704/270 |
| 2007/0250316 A1 | 10/2007 | Ramaswamy et al. | |
| 2007/0250317 A1 | 10/2007 | Davis et al. | |
| 2008/0059173 A1 | 3/2008 | Gilbert et al. | |
| 2008/0300873 A1 | 12/2008 | Siminoff | |
| 2008/0319743 A1 | 12/2008 | Faisman | |
| 2009/0276215 A1 | 11/2009 | Hager et al. | |

\* cited by examiner

00:00:00
NS
[Append]
00:01:00 ←— Transcriber initials — 402
AG
[Append]
00:02:00
[Append] — Button to Append Page — 404
00:03:00
[Append]
00:04:00
[Append]
00:05:00
[Append]         — 406
00:06:00 ← Timestamps increased by 1 minute
[Append]
00:07:00
[Append]
00:08:00
[Append]
00:09:00
[Append]
00:10:00
[Append]
00:11:00
[Append]
00:12:00
[Append]
00:13:00
[Append]
00:14:00
[Append]
00:15:00
[Append]
00:16:00
[Append]
00:17:00
[Append]

400

00:18:00
[Append]
00:19:00
[Append]
00:20:00
[Append]
00:21:00
[Append]
00:22:00
[Append]
00:23:00
[Append]
00:24:00
[Append]
00:25:00
[Append]
00:26:00
[Append]
00:27:00
[Append]
00:28:00
[Append]
00:29:00
[Append]

FIG. 4                FIG. 4 (Cont'd)

Task break-down for Rapid Transcription Process

| | Our Office | Transcriber 1 | Transcriber 2 | Transcriber 3 | Transcriber 4 | Transcriber 5 | Editor 1 | Editor 2 | Client |
|---|---|---|---|---|---|---|---|---|---|
| Before event | Create webpage for Transcribers and Editors. Prepopulate Webpage with individual segments that correspond to anticipated time and length of recording. Include desired transcribing style and client keywords in Webpage. Secure audio feed, and patch into recording computer. Set-up back-up recording computer. | Configures Express Scribe to automatically load from Tigerfish FTP site. Loads Webpage and reserves Segment 1 | Configures Express Scribe to automatically load from Tigerfish FTP site. Loads Webpage and reserves Segment 2 | Configures Express Scribe to automatically load from Tigerfish FTP site. Loads Webpage and reserves Segment 3 | Configures Express Scribe to automatically load from Tigerfish FTP site. Loads Webpage and reserves Segment 4 | Configures Express Scribe to automatically load from Tigerfish FTP site. Loads Webpage and reserves Segment 5 | Configures Express Scribe to automatically load from Tigerfish FTP site. | Configures Express Scribe to automatically load from Tigerfish FTP site. | Logs into password protected webpage. |
| Minute 1 | Record one minute audio Segment with 5 second overlap | Express Scribe automatically downloads Segment 1, and continues to download subsequent segments at one minute intervals, as they are posted. Begins transcribing Segment 1. | | | | | | | |
| Minute 2 | Upload Segment 1 to FTP sites. | | Express Scribe automatically downloads Segment 1, and continues to download subsequent segments at one minute intervals, as they are posted. | Express Scribe automatically downloads Segment 1, and continues to download subsequent segments at one minute intervals, as they are posted. | Express Scribe automatically downloads Segment 1, and continues to download subsequent segments at one minute intervals, as they are posted. | Express Scribe automatically downloads Segment 1, and continues to download subsequent segments at one minute intervals, as they are posted. | Express Scribe automatically downloads Segment 1, and continues to download subsequent segments at one minute intervals, as they are posted. | Express Scribe automatically downloads Segment 1, and continues to download subsequent segments at one minute intervals, as they are posted. | First one minute audio Segment available to review if desired. |
| Minute 3 | Upload Segment 2 to FTP sites. | | Begins transcribing Segment 2. | | | | | | |
| Minute 4 | Upload Segment 3 to FTP sites. | | | Begins transcribing Segment 3. | | | | | |

FIG. 5

| | | | | | | | |
|---|---|---|---|---|---|---|---|
| Minute 5 | Upload Segment 4 to FTP sites. | Completes Segment 1. Posts transcript to Webpage in appropriate cell. Reserves Segment 6. | | | Begins proofreading Segment 1. | | |
| Minute 6 | Upload Segment 5 to FTP sites. | | | Begins transcribing Segment 4. | Completes proofreading Segment 1. Posts to Second Webpage | | |
| Minute 7 | Upload Segment 6 to FTP sites. | Begins transcribing Segment 6. | | | | Begins transcribing Segment 5. | Fact-checks Segment 1 and posts to Client Webpage |
| Minute 8 | Upload Segment 7 to FTP sites. | | Completes Segment 2. Posts transcript to Webpage in appropriate cell. Reserves Segment 8. | Begins transcribing Segment 7. | Completes Segment 4. Posts transcript to Webpage in appropriate cell. Reserves Segment 9. | | Begins proofreading Segment 3 | | Reviews first installation of transcript. |
| Minute 9 | Upload Segment 8 to FTP sites. | | | Begins transcribing Segment 8. | | | Completes proofreading Segment 3. Posts to Second Webpage. Begins proofreading Segment 2. | Fact-checks Segment 3. |
| Minute 10 | | Completes Segment 6. Posts transcript to Webpage in appropriate cell. Reserves Segment 11. | | | Begins transcribing Segment 9. | Completes Segment 5. Posts transcript to Webpage in appropriate cell. Reserves Segment 10. | Completes proofreading Segment 2. Posts to Second Webpage. Begins proofreading Segment 4. | Fact-checks Segment 2. Posts Segments 2 and 3 to Client Webpage |

*FIG. 5 (Cont'd)*

NAVIGATING A SYNCHRONIZED TRANSCRIPT OF SPOKEN SOURCE MATERIAL FROM A VIEWER WINDOW

CROSS-REFERENCE TO RELATED APPLICATIONS

This application is a divisional application of U.S. patent application Ser. No. 12/127,635, filed May 27, 2008, now U.S. Pat. No. 8,306,816 issued Nov. 6, 2012, which claims benefit of U.S. provisional patent application Ser. No. 60/940,197, filed May 25, 2007, the entirety of each of which is incorporated herein by this reference thereto.

BACKGROUND OF THE INVENTION

1. Field of the Invention

The invention generally relates to transcription of spoken source material. More particularly the invention is directed to a method and system for rapid transcription.

2. Technical Background

Transcription is the rendering of the spoken word into written form. While this process goes back to the earliest examples of written poetry and narrative, this discussion will focus on the modern practice of transcription in the various disciplines that have need of it.

Thomas Edison invented the phonograph for the purpose of recording and reproducing the human voice, using a tinfoil-covered cylinder, in 1877. When Edison listed ten uses for his invention, the top item was "Letter writing and all kinds of dictation without the aid of a stenographer." Prior to this, a reporter would have to rely on contemporary notes, and the business world on secretaries trained to take shorthand and type up the notes later. Edison's invention created the possibility that something said in one location could later be transcribed elsewhere, with the additional benefit of repeated listening for greater accuracy. Since then, advances in the field of transcription have been closely tied to the development of recording technology.

By the 1930's, machines specifically designed for dictation and playback had become ubiquitous in American offices. Gradually cylinder-based machines gave way to tape, but until the 1990's the practice of transcription still required the physical delivery of recorded media from the location of recording to the location of transcription.

In the early 1990's, practitioners began to recognize and make use of the potential of the Internet and email in the practice of transcription. Whereas previously a transcript needed to be printed and delivered to a client, Internet email made it possible to simply attach a document in electronic form to an email message. Additionally, as tape recordings began to be replaced by digital media and businesses became more sophisticated in their use of the Internet, recordings destined for transcription could be uploaded to a secure web site and then downloaded by the transcriber.

In spite of these technological advances that have greatly eased the receipt and delivery of transcription materials, transcription of speech remains a cumbersome process that is of limited utility to clients for at least two reasons. The first reason is the amount of time required to transcribe speech into written form; the second has to do with the ability of clients to coordinate the original speech with the completed transcripts.

Transcription relies on the abilities of a trained professional to listen carefully, understand what is being said, and accurately transfer the content and nuance to the written page. To do this well requires a great deal of time. Digital recording and electronic communication have accelerated the transmission of recordings and delivery of transcripts, but a skilled transcriber still requires at least several hours to transcribe one hour of recorded speech. In this era of instant communication and an ever-accelerating need for information and materials, even this amount of time has begun to seem a roadblock to timely business interactions.

The second difficulty referred to above has to do with the difficulty of reconciling a written transcription with its recorded source. For example, a documentary filmmaker may shoot twelve rolls of interviews and have them transcribed in order to find the most useful footage. Even though the transcripts contain time-coding that is synchronized with the recordings, it can still be a cumbersome, time-consuming task for the filmmaker to go back and locate the desired footage based on the written transcript. Often, this sort of project involves many hours of footage arriving from different sources in various locations, thus compounding the problem.

Accordingly, there exists a great need in the art to reduce or eliminate the time inefficiencies imposed on clients by the labor-intensive nature of the conventional transcription process and the difficulty of reconciling the transcript with the source.

SUMMARY OF THE INVENTION

A method and system for producing and working with transcripts according to the invention eliminates the foregoing time inefficiencies. By dispersing a source recording to a transcription team in small segments, so that team members transcribe segments in parallel, a rapid transcription process delivers a fully edited transcript within minutes. Clients can view accurate, grammatically correct, proofread and fact-checked documents that shadow live proceedings by mere minutes. The rapid transcript includes time coding, speaker identification and summary. A viewer application allows a client to view a video recording side-by-side with a transcript. Clicking on a word in the transcript locates the corresponding recorded content; advancing a recording to a particular point locates and displays the corresponding spot in the transcript. The recording is viewed using common video features, and may be downloaded. The client can edit the transcript and insert comments. Any number of colleagues can view and edit simultaneously.

BRIEF DESCRIPTION OF THE DRAWINGS

FIG. 4 shows a main page from the system of FIG. 3;

FIG. 5 shows a matrix diagram illustrating workflow in a rapid transcription process;

DETAILED DESCRIPTION

A method and system for producing and working with transcripts according to the invention eliminates the foregoing time inefficiencies. By dispersing a source recording to a transcription team in small segments, so that team members transcribe segments in parallel, a rapid transcription process delivers a fully edited transcript within minutes. Clients can view accurate, grammatically correct, proofread and fact-checked documents that shadow live proceedings by mere minutes. The rapid transcript includes time coding, speaker identification and summary. A viewer application allows a client to view a video recording side-by-side with a transcript. Clicking on a word in the transcript locates the corresponding recorded content; advancing a recording to a particular point locates and displays the corresponding spot in the transcript. The recording is viewed using common video features, and may be downloaded. The client can edit the transcript and insert comments. Any number of colleagues can view and edit simultaneously.

Figure 1:
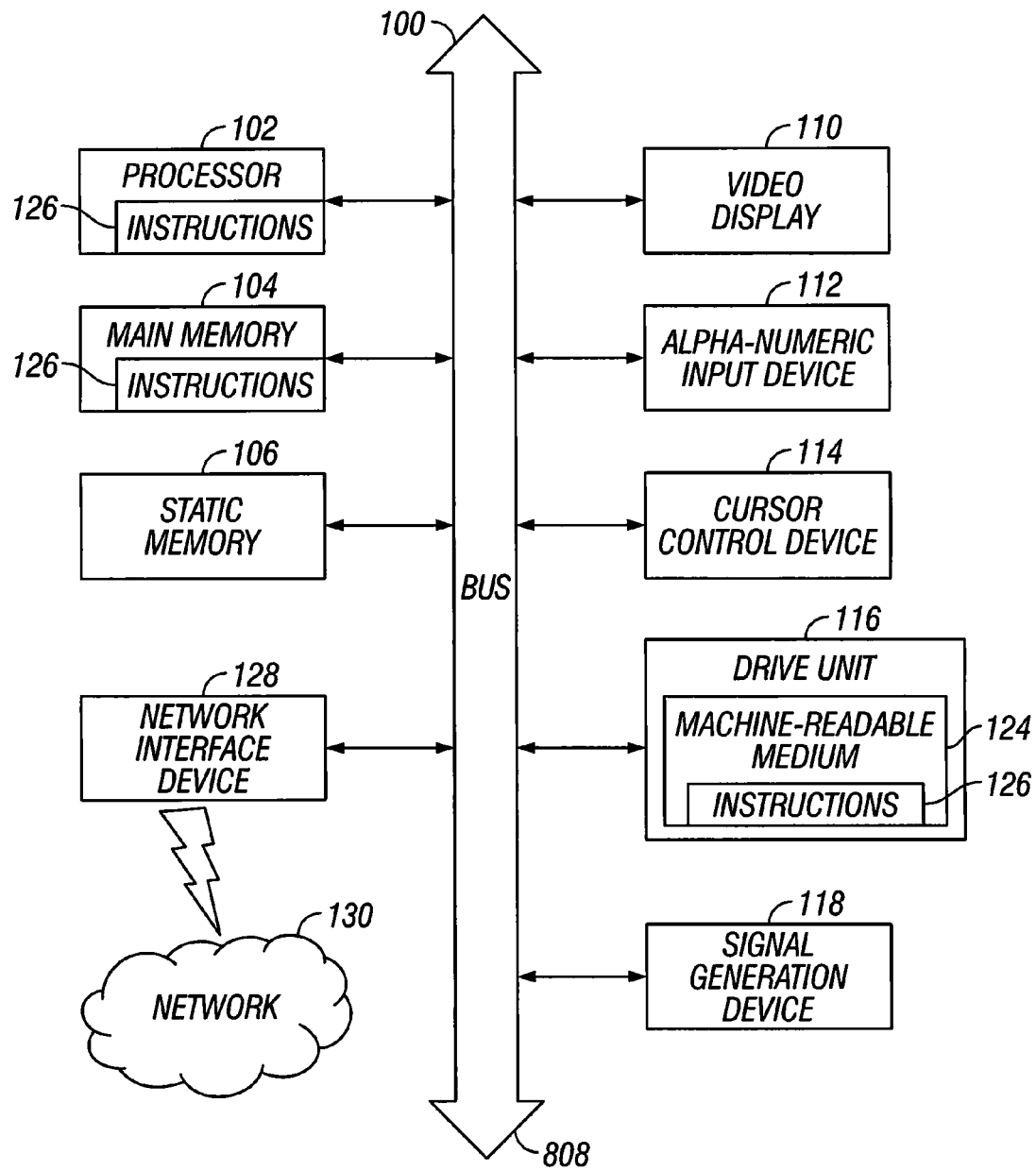
FIG. 1 provides a diagram of a machine in the exemplary form of a computer system within which a set of instructions, for causing the machine to perform any one of the methodologies discussed herein below, may be executed.

Referring now to FIG. 1, shown is a diagrammatic representation of a machine in the exemplary form of a computer system 100 within which a set of instructions for causing the machine to perform any one of the methodologies discussed herein below may be executed. In alternative embodiments, the machine may comprise a network router, a network switch, a network bridge, personal digital assistant (PDA), a cellular telephone, a web appliance or any machine capable of executing a sequence of instructions that specify actions to be taken by that machine.

The computer system 100 includes a processor 102, a main memory 104 and a static memory 106, which communicate with each other via a bus 108. The computer system 100 may further include a display unit 110, for example, a liquid crystal display (LCD) or a cathode ray tube (CRT). The computer system 100 also includes an alphanumeric input device 112, for example, a keyboard; a cursor control device 114, for example, a mouse; a disk drive unit 116, a signal generation device 118, for example, a speaker, and a network interface device 128.

The disk drive unit 116 includes a machine-readable medium 124 on which is stored a set of executable instructions, i.e. software, 126 embodying any one, or all, of the methodologies described herein below. The software 126 is also shown to reside, completely or at least partially, within the main memory 104 and/or within the processor 102. The software 126 may further be transmitted or received over a network 130 by means of a network interface device 128.

In contrast to the system 100 discussed above, a different embodiment of the invention uses logic circuitry instead of computer-executed instructions to implement processing offers. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complimentary metal oxide semiconductor), TTL (transistor-transistor logic), VLSI (very large scale integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments of this invention may be used as or to support software programs executed upon some form of processing core (such as the Central Processing Unit of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Figure 2:
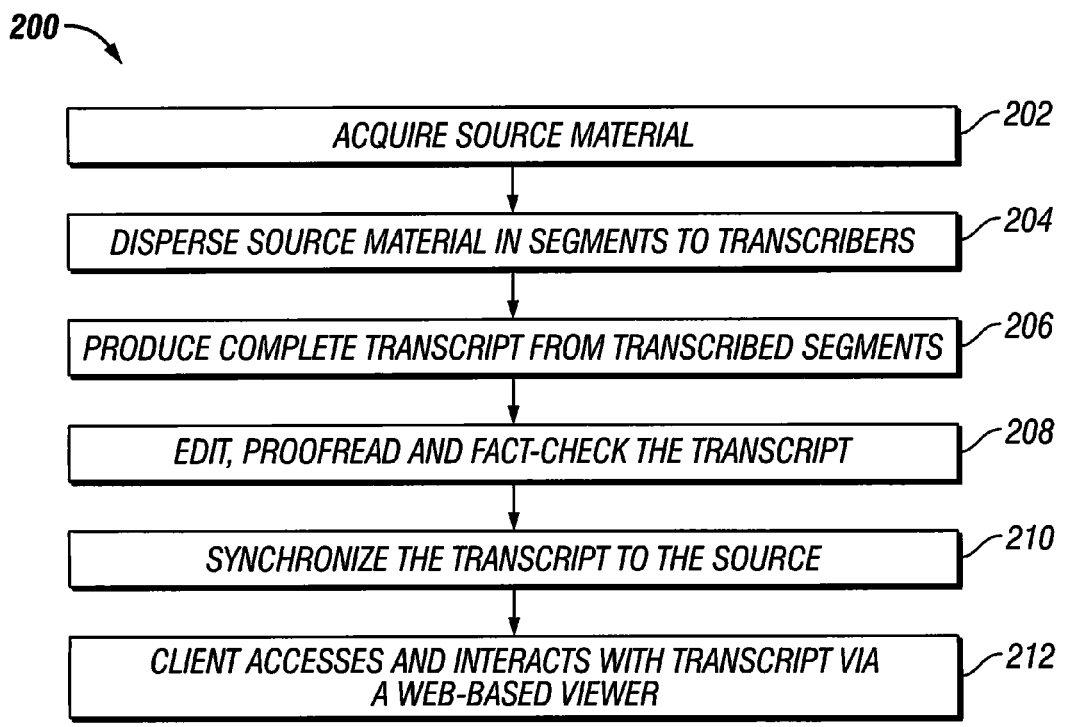
FIG. 2 provides a schematic diagram of a method for rapid transcription.

Turning now to FIG. 2, in overview, a method 100 for rapid transcription may include at least one of the following steps:
Rapid Transcript:
    acquire source material 202;
    disperse source material in short segments to transcribers 204;
    produce transcript from the transcribed segments 206;
    edit, proofread and fact-check the transcript 208;
Synch:
    synchronize the transcript to the source material 210; and
    client accesses and interacts with the transcript via a web-based viewer 212.

The rapid transcript process is used to create, within minutes, a written transcript of taped or live proceedings. The transcript is posted, in incrementally updated segments, on a web page accessible only by the client. The client can read the text directly from the web page, as well as download recordings of the event and copies of the transcript in a series of continually updated documents.

Rapid transcript is useful for creating written transcripts of the following types of events:
    financial conference calls:
    basic conference calls;
    interviews for television or documentary film production;
    conventions and meetings;
        keynotes;
    breakout sessions;
        panel discussion;
    legal proceedings;
        depositions;
    hearings;
        witness interviews and examinations;
    transcription of broadcast for placement on internet;
        candidate debates;
        press conferences; and
    previously recorded sessions requiring immediate transcription.

Rapid transcript employs a novel system configuration that allows a provider to quickly disperse short segments, for example, one minute in length, of a live event or recording to any number of transcribers. This allows each member of a team of transcribers to be simultaneously working on a given segment of recorded material. Thus, if it takes a single transcriber one hour to transcribe a fifteen-minute recording, a team of five transcribers can have the entire segment transcribed, edited, and posted to a web site within twenty minutes. In the case of a live event, this means that participants in a meeting or on a conference call, for example, can be viewing an accurate, grammatically correct, proofread and fact-checked document that shadows the live proceedings upon which it is based by mere minutes. This transcript includes time coding, speaker identification, and a summary of important points. The transcript can be delivered via email or through a secure web page, giving clients easy access via computer or handheld device.

Figure 3:
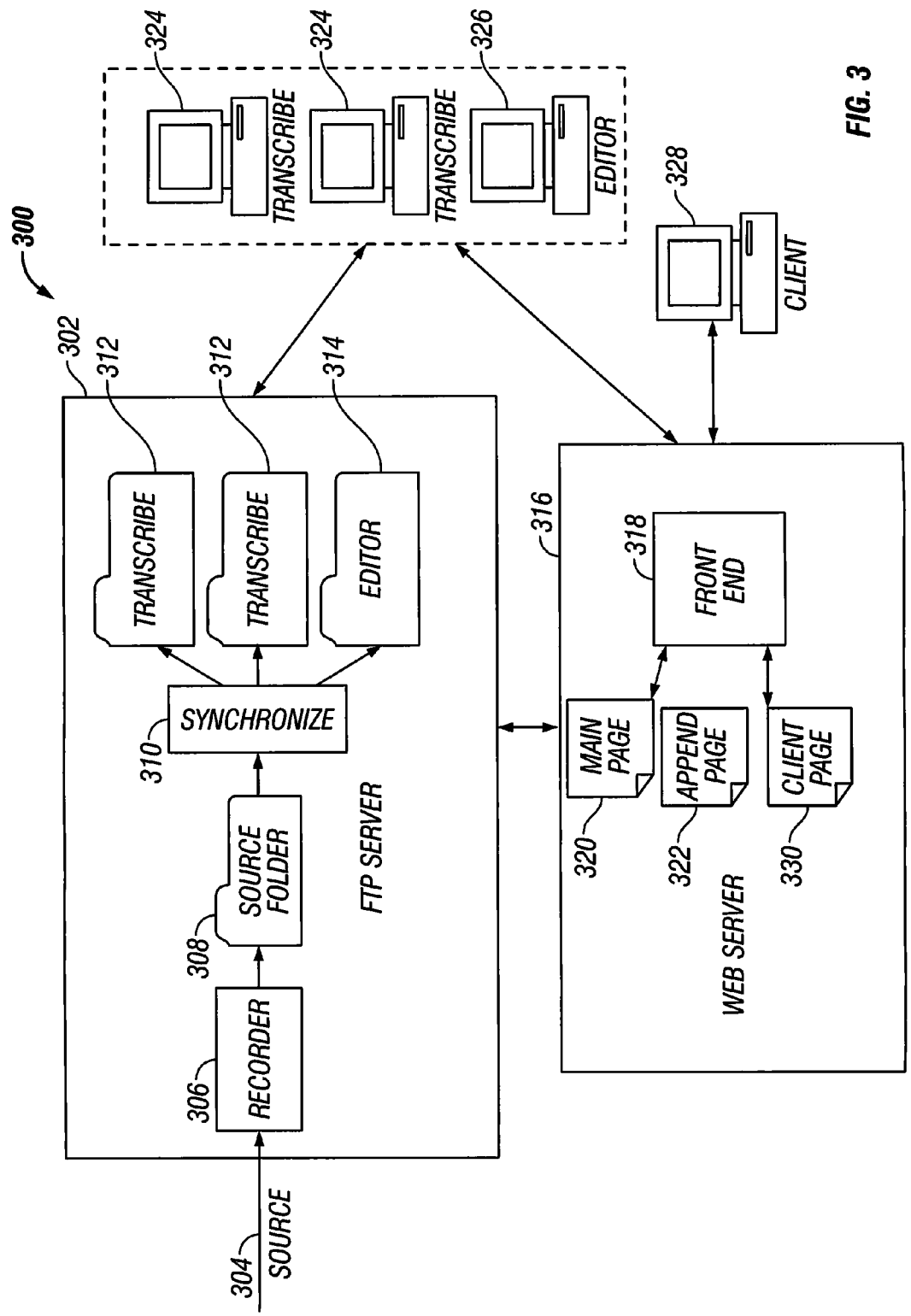
FIG. 3 provides a schematic diagram of a network-based system for producing and working with transcripts.

Referring now to FIG. 3, shown is a schematic diagram of a system 300 for rapid transcribing. At a provider's location, an FTP (file transfer protocol) server 302 receives source material 304 in the form of audio input from any source and encodes the source material into audio files, such as mp3 format or various other compressed media formats. Audio may arrive via the Internet using VoiceOverIP (VOIP), various streaming media, or SHOUTCAST (AOL LLC Dulles, Va.) software. Audio may also arrive via landline telephone or cell phone connection.

The audio signal is converted into segments of predetermined, configurable length, one minute, for example, by a recording system 306, such as the VRS recording system (NCH SOFTWARE PTY. LTD., Canberra, Australia). Each audio segment may be saved to a source folder 308 with a filename that includes a unique alphanumeric code identifying the client and project, followed by the year, month, day, hour, and minute of the segment.

Any number of individual, password-protected folders 312, 314 is established on the FTP server for each transcriber and editor. A synchronization module 310 copies the audio segments from the source folder and pastes a copy of each one into each Transcriber's 312 and Editor's 314 FTP folder. In one embodiment, SYNCTOY (MICROSOFT CORPORATION, Redmond, Wash.) fills the role of synchronization module. When copying files from the source folder 308 to the transcriber and editor folders 312, 314, using SYNCTOY'S 'combine' synchronization method assures that files exist at both locations, while deleted and renamed files are ignored. Using such a synchronization method is preferred in this case because, as explained below, during the production process, as transcribers transcribe audio segments downloaded from the FTP server, the segments are deleted from transcriber's folder. The use of a synchronization method that ignores deleted files assures that system resources are not wasted copying files from the source folder 308 unnecessarily.

The transcriber stations and Editor stations 324, 326 are typically, but not necessarily, located off-site. A transcriber station 324 typically constitutes a computational device programmed to enable transcription of human speech. In one embodiment, the computational device is programmed with transcribing software, such as EXPRESS SCRIBE (NCH SOFTWARE PTY., LTD.). Additionally, the transcriber station 324 includes a transcriber operating the computational device to transcribe downloaded segments.

An editor station 326 typically constitutes a computation device programmed to enable activities such as editing, proofreading and fact-checking. Additionally, the editor station includes an editor using the computational device to perform the activities of an editor.

In FIG. 3, the transcriber stations 324 and editor stations 326 are surrounded by a dashed line for ease of representation to indicate the similarity of their status as clients to the web server 316 and the FTP server 302. Double-headed arrows between the transcriber stations and editor stations and the servers are included to illustrate the bidirectional data flow between the clients and the servers. The dashed line is not intended to indicate that the client, in the form of transcriber stations 324 and/or editor stations 326 are disposed at the same location, although they could be.

A web server 316 includes a front end 318 that manages authentication to the main page 320—described in greater detail below. Whenever a transcriber arrives at the main page URL, the log-in action through a 'before_filter' verifies a browser's session user ID against those stored at the web server 316. If verification fails, the browser is redirected to a login page. If the browser authenticates successfully, the browser is redirected to the main page.

Preferably, a new, password-protected web page is created for each Rapid Transcript project that may include: one or more main pages 320 for use by the Transcribers, one or more append pages 322, and one or more Client pages 330 upon which the final edited transcript is posted.

FIG. 4 shows an exemplary main page 400. As shown in FIG. 4, the main page 400 includes an alternating sequence of time stamps and buttons 406 and buttons 404. The main page 400 is refreshed at regular intervals, one minute, for example. As in FIG. 4, the initial time stamp in the main page preferably starts at 00:00:00. Each subsequent time stamp in the time stamp sequence is incremented by fixed interval, for example, one minute, until the sequence reaches the duration of the recorded source material. The time stamps are preferably displayed in HH:MM:SS format. As shown, time stamps 406 alternate with buttons on the page.

Clicking one of the buttons redirects the browser to an append page 322 that is associated with the time stamp above the button. An append page contains a text field and a text field 'submit' button. It is to be noted here that portions of an embodiment of the present application employ a model-view-controller development framework, for example "Ruby on Rails", wherein the "model" is understood to constitute a data model, the "view" constitutes a user interface and the "controller" constitutes the application's control logic. However, other programming approaches and/or development frameworks can be employed to implement the system herein described and are within the scope of claims. The text field 'submit' button, when clicked, submits the text field input to an action which then passes the input to a model, which, in turn, adds the input to a data structure, such as a table, which is associated with a particular time stamp. Transcribers "claim" a segment for transcription by placing their initials in the field associated with a given audio segment. In this way, a group of transcribers is able to spontaneously organize itself for maximum efficiency.

For example, as shown in FIG. 4, the first two time stamps bear the transcriber initials "NS", and "AG", respectively. Thus, those two segments have been claimed by the transcribers identified by the initials "NS" and "AG." As above, the transcriber may claim a time stamp by clicking the 'append' button for the time stamp, which navigates the transcriber to the 'append' page 322 for the time stamp. Upon gaining access to the 'append' page, the transcriber may enter his/her initials in the text field, and click the 'submit' button, whereupon the transcriber's initials are entered into the data structure for the time stamp and subsequently displayed on the 'append' page. In one embodiment, as shown in FIG. 4, the transcriber's initials appear above the 'append' button for the time stamp.

As previously described, recorded segments are written to the transcriber folders 312 on the FTP server 302. In order to download the recorded segments to a transcribing station 324, the transcriber sets up an automated incoming FTP connection. The transcribing software on the transcription station is then configured to authenticate and check for new files in the transcriber's folder 312, at regular intervals of, for example, one minute. As new files become available, they are automatically downloaded to the transcription station 324. Whenever the client station downloads new files over the FTP connection, the transcriber can chose to transcribe a new audio file.

In actual practice, the transcriber transcribes only files that the transcriber has claimed by means of the foregoing reservation process.

The transcriber looks for the claimed file among the downloaded audio files and transcribes the claimed file.

After finishing the transcription, the transcriber may then upload the transcription by the previously described process for submitting input: he/she navigates to the main page 320, clicks the 'append' button 404 for the particular time stamp. Clicking the 'append' button navigates the transcriber to the 'append' page 322 for the time stamp. The transcriber then pastes the transcript into the text submit box for the time stamp, clicks the 'submit' button and the text of the transcript is submitted in the manner previously described. Subsequently, the transcriber's browser is then navigated to the main page 320 to claim another time stamp. In this way, a rough draft of the source material is produced by a team of transcribers working in parallel.

It should be noted that the Rapid Transcript process can also make use of stenography or voice recognition software to produce this initial rough draft.

If a staff member is observing a live meeting involving multiple speakers, she may also log-on to the main page 320, and take notes regarding the speaker ID directly on the web page. Transcribers can consult this speaker ID log while transcribing.

The next step is to edit the individual segments into a single document. An editor logs on to the project website and copies transcribed text from one or more cells (text from more than one cell can be copied in one swath). The text is then pasted into a word processing program on the Editor's computer. The editor listens to the audio segments and cross-references the transcribed material against the recorded segments. If the material at this point is ready for the client, the editor uploads the edited transcript to the Client web page. If the material requires additional fact-checking, the editor can upload the edited transcript to a second website, where another reviews the material and checks facts.

The Rapid Transcript Web Page

A client begins by logging on to the provider's password protected website. This brings the client to a dedicated web page containing a list of the client's projects. More will be said about the client page herein below. Any number of people associated with a given project may be logged on concurrently.

The web page created for the client consists of the transcript, with time coding, side by side with a column containing a summary, if requested. Links to the one-minute audio or video segments are provided, as well as a link to a recording of the entire proceeding. As well as reading from the website, the client is able to download the transcript in either PDF or word-processing file formats. The transcript can also be sent by email directly from this web page.

Translation

The rapid transcript method can be utilized in translation as well. For a session that includes a translator, the client's web page typically displays three main columns: transcription in the original language, the translator's words, and the provider's own expert translation.

Turning now to FIG. 5, shown is a matrix depicting an exemplary workflow for the rapid transcript process. The timeline shown in FIG. 5 is merely illustrative and is not intended to be limiting. The following description proceeds by describing the role of each of the parties at each point on the timeline.

Initially, before an event, a number of preparatory activities are carried out, by the provider, the transcribers and the editors. The provider for example may perform any of:

Creating a web page for the transcribers and the editors;

Pre-populating the web page with individual segments that correspond to the anticipated time and length of recording;

Specifying in the page the desired transcribing style and client keywords;

Securing an audio feed and patching into the recording computer; and

Setting up a backup recording computer.

Each of the transcribers and editors may also have a preparatory role. For example, each may need to configure his or her audio playback software to download recorded segments. Additionally, each transcriber claims at least one segment. Finally, the client, in anticipation of the event, may log onto a password protected web page. More will be said about the client's page below.

At minute 1, the provider records the first segment of the speech that is to be transcribed. In one embodiment, the segment length is set at one minute. However, segment length is a configurable parameter and thus, the exemplary segment length of one minute is not intended to be limiting. It should be noticed that the segments are recorded with an overlap in order to prevent loss of material. In one embodiment, the overlap is configured to be five seconds in length.

At minute 2, the provider uploads segment 1 to the FTP site. Transcriber 1 downloads segment 1 and begins transcribing it. The remaining transcribers download subsequent segments as they become available. The client may, from their web site, review the audio of segment 1.

At minute 3, segment 2 is uploaded to the FTP site and transcriber 2 begins transcription of segment 2.

At minute 4, the provider uploads segment 3 and transcribers 3 begins transcribing segment 3.

At minute 5, the provider uploads segment 4 to the FTP site. Transcriber 1 completes transcription of segment 1. Transcriber posts the transcript to the web page in an appropriate cell and claims segment 6. Transcriber 4 begins transcription of segment 4. Editor 1 begins proofreading of segment 1.

At minute 6, the provider uploads segment 5 to the FTP site and transcriber 5 begins transcription of segment 5. Editor 1 completes proofreading of segment 1 and posts the proofread transcription to a second web page.

At minute 7, the provider uploads segment 6 to the FTP site and transcribers 1 begins transcription of segment 6. Transcriber 3 may complete transcribing of segment 3 and posts the transcript to the web page in the appropriate cell. Transcriber 3 then claims segment 7. Editor 1 begins proofreading segment 3. Editor 2 fact-checks segment 1 and posts to the client web page.

At minute 8, the provider uploads segment 7 to the FTP site. Transcriber 2 may finish with segment 2 and post it to the web page in the appropriate cell, and then claim segment 8. Transcriber 3 may begin transcribing segment 7. Transcriber 4 may begin transcribing segment 4 and posts it to the web page in the appropriate cell. Transcriber 4 then may claim segment 9. Editor 1 completes proofreading segment 3 and posts the proofread transcript to the second web page. Editor 1 may then begin proofreading segment 2. The client may review the first installation of the transcript.

At minute 9, the provider uploads segment 8 to the FTP site. Transcriber 2 may then begin transcription of segment 8. Editor 1 typically completes segment 2 by this time and posts it to the second web page. Editor then proceeds to proofread segment 4. Editor 2 fact-checks segment 3.

At minute 10, there may remain no further segments to upload. Transcriber 1 completes segment 6 and posts it to the web page in the appropriate cell. Transcriber 5 completes segment 5 and posts the transcript to the web page in an appropriate cell. Editor 1 completes proofreading segment 4 and posts to the second web page. Editor 1 then begins proofreading segments 5 and 6. Editor 2 fact-checks segment 2 and posts segments 2 and 3 to the client web page.

At minute 11, Editor 1 completes proofreading segments 5 and 6. Editor 2 begins and completes fact-checking segment 4. The second installation of the transcript is available to the client, containing segments 1-3.

At minute 12, Editor 2 begins and completes fact-checking segments 5 and 6. The workflow proceeds in such fashion until all segments have been transcribed, edited and fact-checked and reviewed by the client. The rapid transcript process may terminate, for example, approximately five minutes after the end of a live event with the delivery of a completed transcript. Additionally, the client may download the audio and/or video of the entire event from the client's project web site. Additionally, the transcript may be downloaded as a word-processing or .PDF file, or sent via email.

As described above, the usefulness of a conventional transcript to the client is limited because the transcript is not synchronized to the source content. Therefore, the client must spend a great deal of time searching through the transcript and the source material in order to reconcile them to each other. In order to eliminate this cumbersome chore, transcripts are synchronized to the source material.

Synch links a written transcript to its source material. In one embodiment, the process of linking transcript and source material follows the rapid transcript process, either immediately or at some unspecified future time. In another embodiment, the synchronization process can be applied to any conventional transcript produced from audio and/or video source material. A web page allows a client to view a video recording, for example, side-by-side with a transcript of the video's audio content. In one embodiment, the client sees four main items on the screen: A video, a transcript, a list of projects, and a "tagg" table. A tagg is a memo or description created by the client that describes the contents of a portion of the video. In this way, the client is provided a means for reviewing and making decisions concerning audio or video recording by means of a transcript which is linked to the recording. Multiple recordings can thus be categorized and referenced; a particular phrase can be located in the written transcript and immediately reviewed in the recording.

Each point in the recording is synchronized to the corresponding text in the written transcript, so that clicking on a word in the transcript automatically locates the corresponding spot in the recording. Conversely, advancing a recording to a particular point automatically locates and displays the corresponding text in the transcript. The recording can be viewed using common video viewing features (play, stop, skip forwards and backwards, play at various speeds, etc.), and may be downloaded. The client can read and edit the written transcript, and insert comments. Any number of colleagues can be using this service to work on a series of transcripts simultaneously.

To synchronize the source material with the transcript, the source material is generally converted to a media player file format, if necessary. One embodiment converts source videos to the QUICKTIME (APPLE, INC., Cupertino Calif.) video format. The ordinarily skilled practitioner will also appreciate that the QUICKTIME application can also play many other types of media files, such MPEG, MP3 and WAV. Thus, audio files can also be rendered in a format compatible with the QUICKTIME player.

As previously described, one or more transcribers create a transcript of the source material, typically using a word processing application such as WORD (MICROSOFT CORPORATION). At the time the transcription is created, the transcriber(s) place(s) time code markers in the transcript. If necessary, the transcript may be re-formatted using a text editor, such as TEXTPAD (HELIOS SOFTWARE SOLUTIONS, Longridge, UK). Using a media transcription application such as INQSCRIBE (INQUIRIUM, LLC, Chicago, Ill.) the media file is combined with information about the embedded time codes in the transcript. The transcript is then further formatted to convert into a table wherein the time codes and the written words in the transcript are associated with each other in a one-to-one relationship. In one embodiment, converting the transcript to a table is accomplished by using a spreadsheet application, such as EXCEL (MICROSOFT CORPORATION) to format the transcript into cells consisting of time codes and transcript words. Each cell from the spreadsheet file then becomes a field in the database table. The words of the transcript are associated to the appropriate segment of source content by means of the time codes. As described below, a project includes a database, wherein the transcript tables are stored. When the client selects a project to view, as described below, the transcript is reconstituted by displaying the words stored in the database in the correct order.

As previously described in relation to the time code process, a web site is created for each project. The project web site preferably includes at least one password-protected client page 328 wherein the client is able to view the transcript.

Log In

Figure 6:
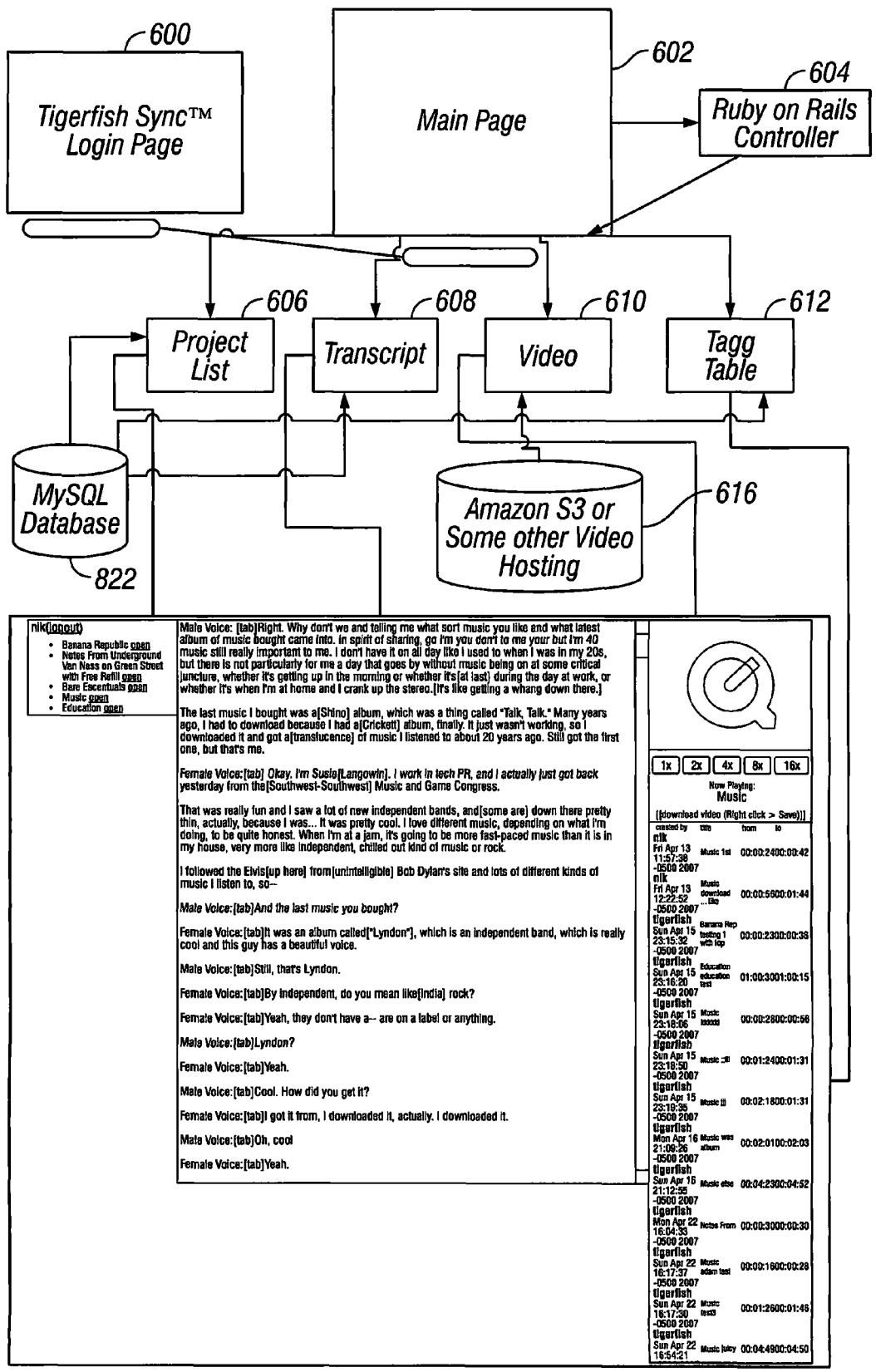
FIG. 6 shows a schematic diagram of the functional architecture of a system for working with transcripts.
Figure 7:
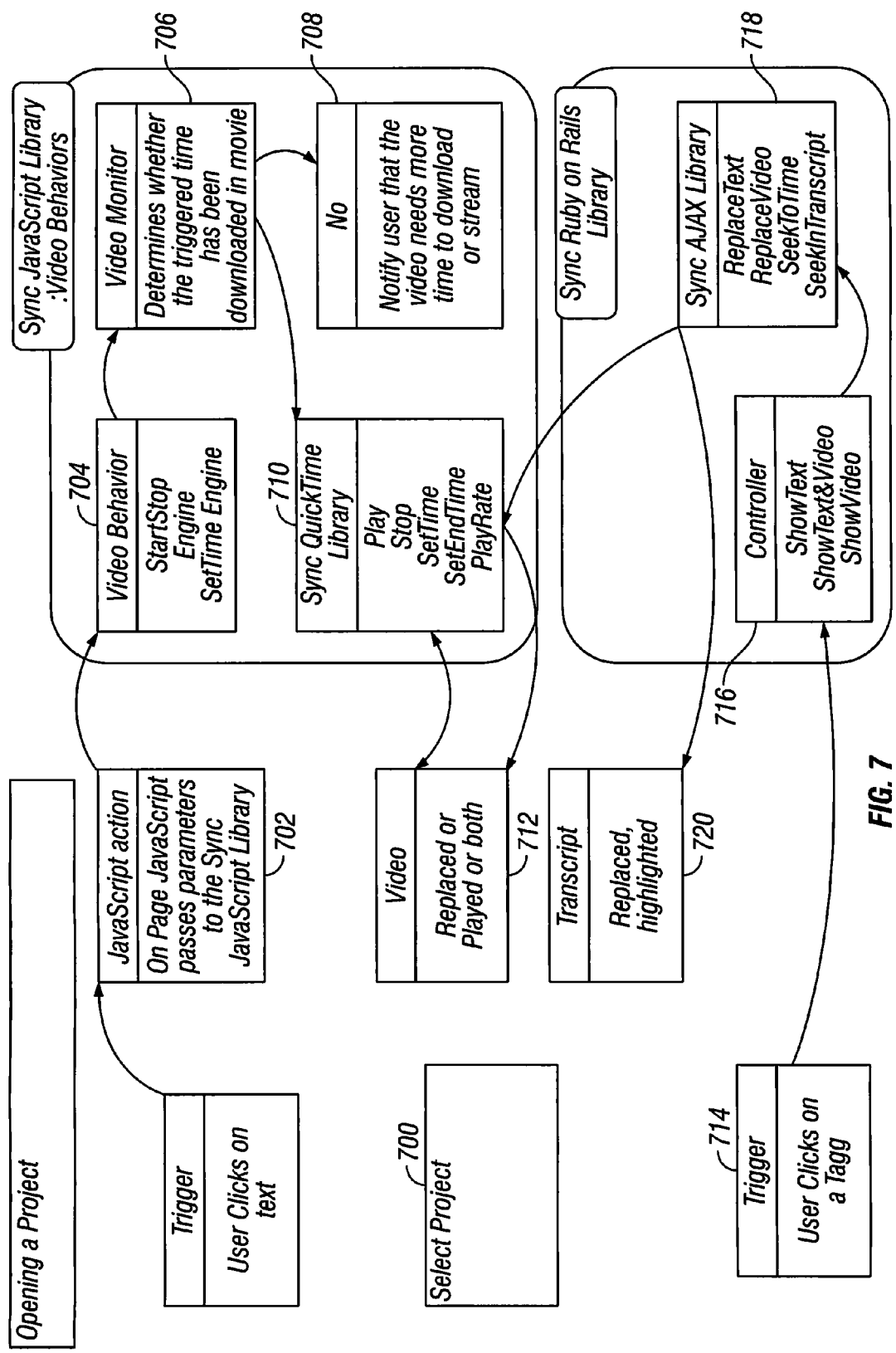
FIG. 7 provides a flow diagram of a sub-process for opening a project.
Figure 8:
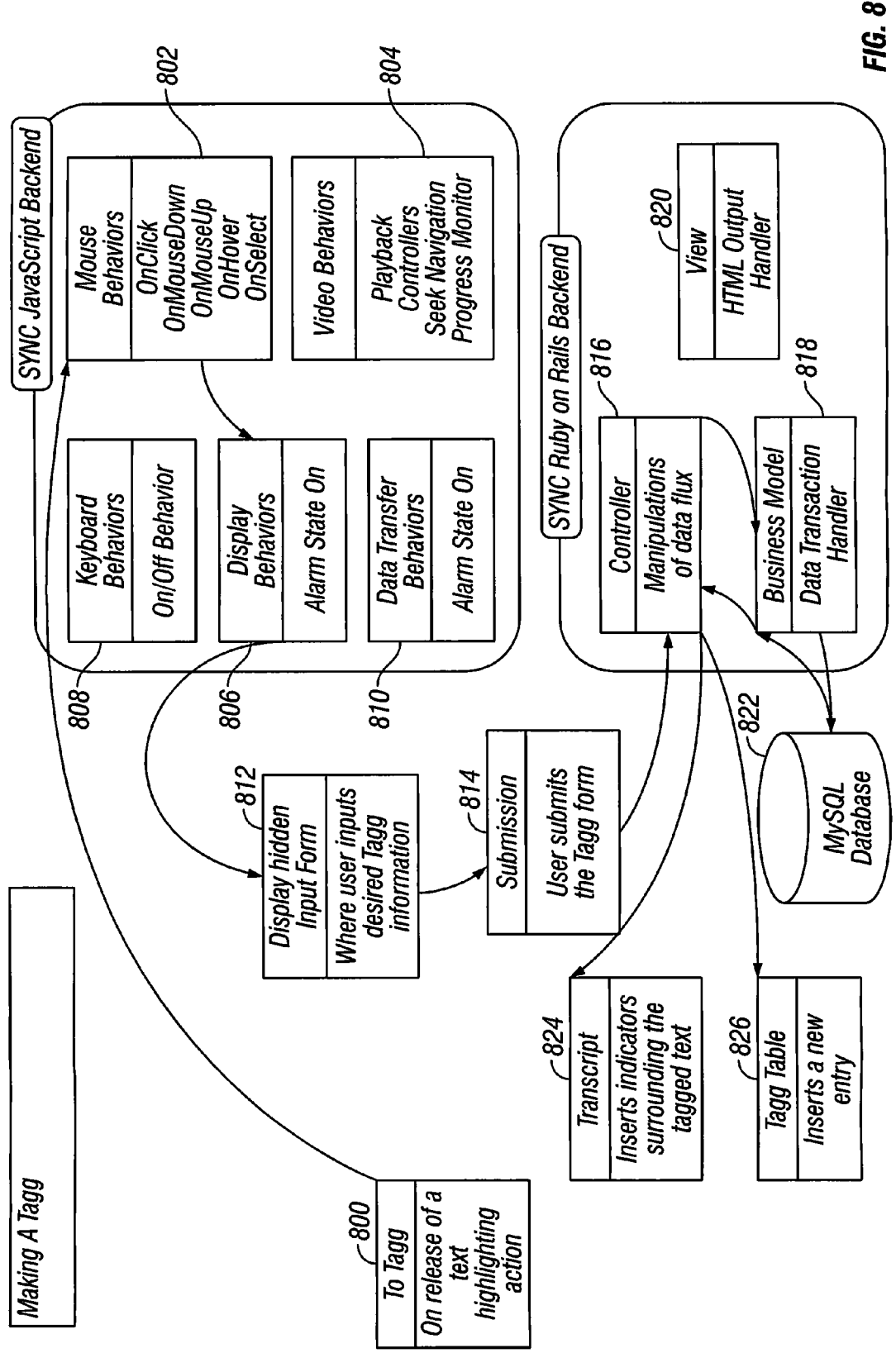
FIG. 8 provides a flow diagram of a sub-process for making a tagg.
Figure 9:
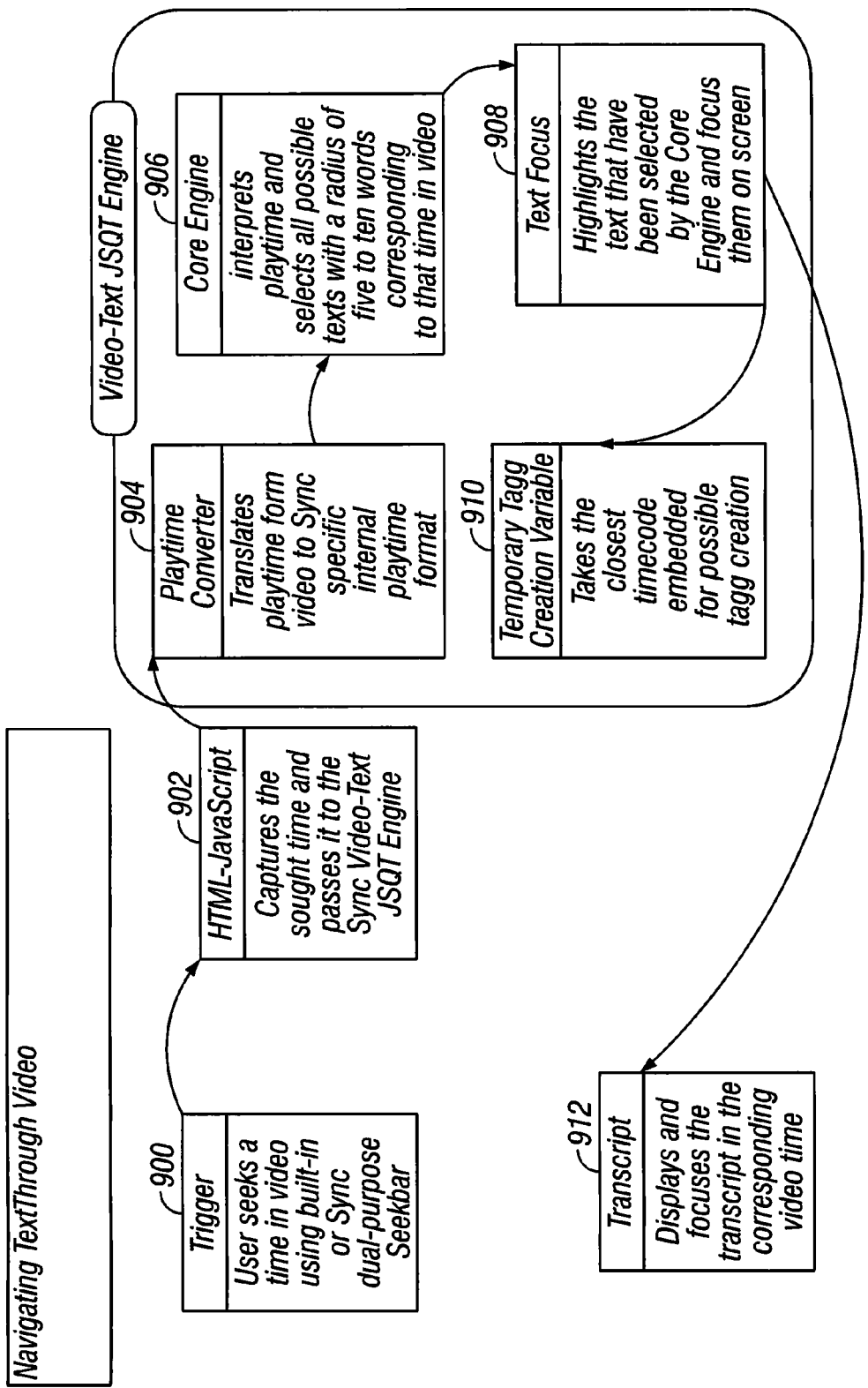
FIG. 9 provides a flow diagram of a sub-process for navigating text through video.
Figure 10:
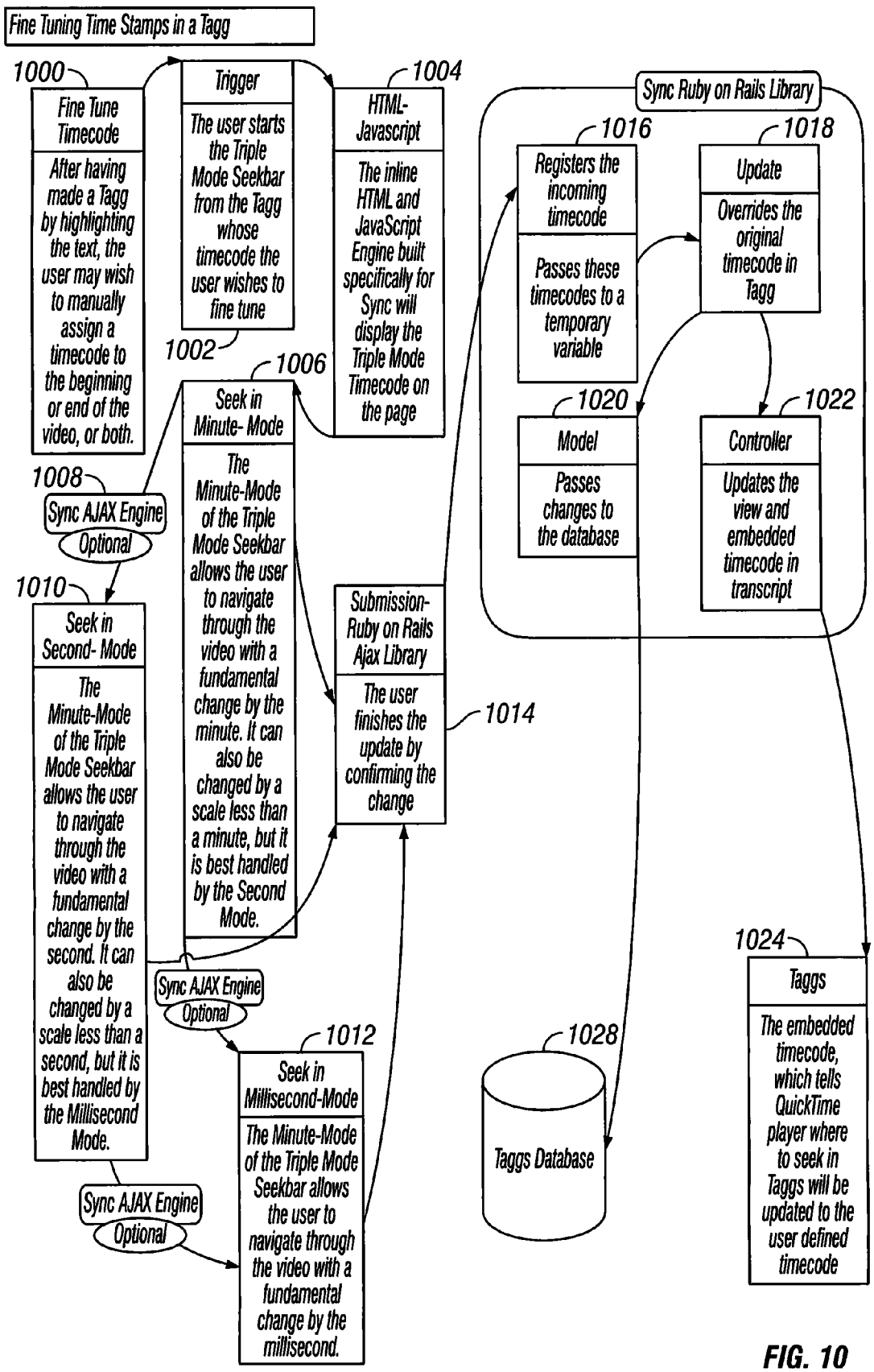
FIG. 10 provides a flow diagram of a sub-process for fine-tuning time stamps in a tagg.

As above, a project is created, for example, in 'RUBY ON RAILS.' As above, the project is preferably password-protected. Authentication is preferably managed by the development platform by components provided within the development platform, including an authentication database and controller. A client begins by logging on to the password-protected web site. This brings them to the client page, 328, a detailed view 602 of which is shown in FIG. 6, which contains a list of their projects. Any number of people associated with a given project may be logged on concurrently.

Main Interface

Having negotiated the authentication process, the client gains access to the main interface. In one embodiment, the main interface includes one or more of the following sections:

Project List 606;
Transcript 608;
Video 610; and
Tagg table 612.

After having logged in, the client's web browser calls a controller 604 from 'Ruby on Rails.' The controller collects all the HTML items and text items from the 'Ruby on Rails' model and from the 'Ruby on Rails' view template. These text items are displayed in a pre-made template on the client's browser. The template is specified by the HTML items mentioned above. The template specifies which text item goes to which portion of the four portions of the main page 602 mentioned above. Then the main page is loaded.

Opening a Project

The client opens a project 700 by selecting a project from the list 606. This brings up the web page where, on one side of the screen, one can view a recording 610 and, on the other side, there is a corresponding written transcript 608. As described above, the transcript and video are linked. That is to say, each point in the recording corresponds to a specific place in the written transcript. Additionally, the project's tagg table is displayed 612. Whenever a client selects a project different from the current one being displayed, the web page replaces these four elements with elements of the new project without the browser being reloaded. The replacement is done by a script that hides the element that is being replaced and sets the new element's CSS (cascading style sheets) 'visibility' attribute to "visible." All projects are loaded. Their CSS 'visibility' attribute is, by default, set to "hidden."

Navigating Video, Text, and Taggs

An embodiment enables the linking and coordination of the viewable recording, the written transcript, and the various associated taggs. Each point in the recording corresponds to a specific place in the written transcript; if taggs have been created they are linked to specific places in both the video and the written transcript. The client, then, has three options for navigating the material: clicking on a word in the transcript automatically locates the corresponding spot in the recording; advancing a recording to a particular point automatically locates and displays the corresponding spot in the transcript; and clicking on a tagg will bring the user to the corresponding places in the video and transcript, and display the contents of the tagg in a dialogue box.

1. Navigating by way of the Transcript

After the project is open, the client may click on any text in the transcript. Clicking on a point in the transcript automatically locates the corresponding spot in the recording and plays the recording from this spot forward. This occurs because an event called ST (Set Time) 704 in a JavaScript library 702 that passes the video ID and the time stamp which are embedded in the text to the QUICKTIME player 710. The QUICKTIME player automatically issues a CB (Call Back) which carries the message whether or not the portion of video has been loaded. When the very same JavaScript library 702 receives this message it either notifies the client through a CSS pop-up that the video is still being downloaded and cannot be played, or it plays the video, beginning at the spot indicated by the time stamp 706.

Additionally, advancing a recording to a particular point automatically locates and displays the corresponding spot in the transcript.

The client can view the recording using common video viewing features (play, stop, skip forwards and backwards, play at various speeds, and so on).

The client can also read and edit the written transcript. When the client mouses over the written transcript, a transparent "balloon tip" reveals the time code in the corresponding recording. Depending on the client's specifications, time codes may show the elapsed time of the recording, the day and time of the original recording, or the SMPTE (Society of Motion Picture and Television Engineers) time code embedded in the original recording.

The transcript may also be downloaded.

2. Navigating by way of the Video

The client can drag the play bar in the QUICKTIME player to a desired position 900. The client then pushes a 'Show Text' button next to the QUICKTIME player. This calls a JavaScript function 902 which passes the current playtime timestamp in the QUICKTIME player to a JavaScript library which then evaluates 904 (which converts hours/minutes/seconds timestamp to an integer timestamp) and finds the closest matching word ID 906 whose timestamp is the closest match to the current playtime timestamp 902. This JavaScript function then highlights the text 908 whose timestamp matches the word ID that was just found. This very same JavaScript function passes that word ID and timestamp to a hidden form for possible tagg creation 910. The browser displays and highlights the text corresponding to the words spoken in the video 912.

3. Navigating by using Taggs

As above, a tagg is a memo of description created by the client that describes the contents of a portion of the video. By interacting with the tagg table, the client is able to navigate through the video, in a similar manner to that enabled by interacting with the transcript. The client may click on a tagg 714 whose URL calls an action 'Show Text' 716 in the controller 604. The action then calls a plurality of functions from the JavaScript library 702: 'Replace Text', 718 'Replace Video' 718, 'Start/Stop' 718 and 'Seek in Transcript' 718:

'Replace Text' and 'Replace Video' both use the CSS 'visibility' attribute to hide a current video and show the desired video;

'Start/Stop' uses the default QUICKTIME API 710 (application programming interface) to set the start time and the stop time of the video. The video is then played immediately;

The 'Seek in Transcript feature' uses the default 'Set Timeout' JavaScript function and the 'Focus' function to center and highlight the text 720 relating to this time stamp for five seconds.

The video is replaced and played, and the text is centered and highlighted.

Creating a Tagg

When the client finds a useful or interesting portion of the written transcript, he or she can create a tagg. Any number of taggs can be created by various users in a single project and they can be cross-referenced with multiple recordings and transcripts within a project. Taggs are created by highlighting a desired portion of text. Once the text is highlighted, a dialogue box appears and the client may give this tagg a title. Taggs may be of any length. A new tagg may overlap an existing segment. Additionally, a tagg may have a 'name' attribute, which allows the client, or another party to assign a name to the portion of the recorded source material that the Tagg applies to.

When a new tagg is defined by the client, the program automatically records details related to the tagg, including the author of the segment; the date and time the segment was created; the original recording that correlates with the segment; and the beginning and ending time codes of the segment.

MARKERS: Once a tagg has been defined, the written transcript includes visual markers that identify the starting and ending points of the tagg. Markers are named according to the source recording. The opening marker of a segment is displayed in colored text, green for example; the closing marker is displayed in a color distinct from that of the opening marker, red for example.

COMMENTS: Immediately upon defining a tagg, clients are prompted to write a comment. The client may write a comment of any length relating to a given tagg. Additionally, a client may add a comment to a previously created tagg. Clients can also record comments about taggs in response to other clients' previously written remarks. This may serve as a forum for discussing materials.

When "mousing over" the beginning or ending markers, a balloon opens with comments and identifying information.

To create a tagg, the client highlights 800, using the mouse, a portion of the transcript. Highlighting the portion of the transcript triggers a pair of JavaScript events 802:

'OnMouseDown' passes a Word ID, transcript ID, and a timestamp of the first word highlighted to a hidden html form 812; and 'OnMouseUp' passes a Word ID, transcript ID, and a timestamp of the last word highlighted to the hidden html form 812, which triggers a third event called 'FormPopUp'.

The 'FormPopUp' event utilizes the CSS 'visibility' attribute to unhide the hidden form 812 mentioned above, so that the client is now able to enter desired descriptive information in this form. When he or she has done so, the client clicks a button which submits the form to a URL which triggers a 'Create Tagg' action in a 'Ruby on Rail's controller 816. That action sends the parameters to the tagg model 818 in 'Ruby on Rails', where a validation function is triggered that checks all the incoming data.

Table: All comments relating to any recording in a given project, along with their identifying details as described above, are stored in the tagg table 612. The tagg table may be viewed and edited online, or downloaded for use in spreadsheet applications. Additionally, the tagg table, or any portion thereof, is separately exportable. In one embodiment, at least the export version of the tagg table is written in a standardized markup language such as XML (eXtendible Markup Language) so that the tagg table is compatible with video editing programs such as FINAL CUT PRO (APPLE, INC.) or AVID (AVID TECHNOLOGY, INC. Tewkesbury, Mass.). In this way, taggs can be used to facilitate the processes of video logging and editing.

The table may be sorted according to various criteria. For example, a client may wish to view all of the material related to a particular speaker, and next to see which videotapes this material is on. As such, this is a valuable tool for editing, as it allows people to organize material from various sources.

The table is linked to the transcripts. Clicking on an item in the table will bring to view the corresponding point in the transcript and recording.

Taggs may be edited, removed from the table perhaps to be used later, or permanently deleted.

A client may place (or remove) a star next to her favorite segments to assist in editing. Segments may be sorted by the criterion of stars.

If all data is validated, the model creates a new row 826 in the 'MySQL' database table 822. The 'Ruby on Rails controller' 816 calls a built in 'Prototype' JavaScript event which updates the client's browser with the new data, without reloading the browser.

If not all data is validated, the model 818 calls the Ruby on Rails controller 816 to send back to the client's browser an error message, which is displayed by setting the CSS 'visibility' attribute of the error message HTML div tagg to "visible."

Fine Tuning Time Stamps of a Tagg

The client clicks 1002 on a time stamp in the tagg table 612. This triggers an 'OnClick' JavaScript event that calls the inline html JavaScript function 1004 to replace this time stamp with an editable field. This editable field contains four subfields labeled Minute 1006, Second 1010, and milliseconds or Frames 1012. The client can then manually input a number in one or more of these subfields. The client either hits "Enter" or "Escape" 1014.

Hitting 'Enter' or clicking anywhere on the browser submits these parameters to an action 1016 in the 'Ruby on Rails' controller 716 that passes these parameters to a model 1020 in 'Ruby on Rails' which does a validation of this data. If the date is validated, the model updates the entry in the MySQL database table 1028. The action 1016 also overrides the original time code in tagg 1018 and sends these parameters back to another action in the controller 1022 which updates 1024 the tagg in the tagg Table in the client's browser without reloading it.

Hitting 'Escape' triggers an 'onkeypress' JavaScript event which triggers a JavaScript function to cancel and remove the editable mode and hence leave the timestamp unmodified. The JavaScript function also restores the display mode 1014.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

The invention claimed is:

1. A computer-implemented method of working with a transcript of spoken source material comprising the steps of:
   displaying a client project list in a first pane within a viewer window;
   selecting a project to view from the client project list;
   displaying a source material player and a synchronized transcript for the project in a second pane and a third pane within the viewer window, wherein the synchronized transcript is formed by a process comprising the steps:
   receiving source material at a provider server;
   automatically dispersing segments of said source material from the provider server to any of a plurality of transcribing stations;
   receiving at the provider server an edited, proof-read transcript of each segment dispersed;
   producing from said transcripts the synchronized transcript of said source material that is synchronized with said source material;
   using said synchronized transcript to navigate through said source material;
   using said source material to navigate through said synchronized transcript; and
   creating and appending comments regarding either said source material or said synchronized transcript.

2. The method of claim 1, wherein synchronizing said source material and said synchronized transcript comprises the steps of:
   assigning incremental time stamps to said source material;
   time-coding instances within said synchronized transcript that correspond to said source material; and
   associating said time codes to said time stamps by means of a table.

3. The method of claim 2, wherein the instances are written words in the synchronized transcript.

4. The method of claim 1, wherein the first pane, the second pane, and the third pane are simultaneously viewable within the viewer window.

5. The method of claim 1, wherein said step of using said synchronized transcript to navigate through said source material comprises navigating to a portion of said source material by selecting a corresponding portion of said synchronized transcript.

6. The method of claim 1, wherein said step of using said source material to navigate through said synchronized transcript comprises navigating to a portion of said synchronized transcript by selecting a corresponding portion of said source material.

7. The method of claim 1, wherein said step of creating and appending comments regarding either said source material or said synchronized transcript comprises the steps of:
   creating comments regarding any of a portion of source material and a portion of said synchronized transcript;
   saving said comments to a tagg table;

displaying said tagg table in said viewer window;

navigating one or both of said source material and said synchronized transcript by selecting a portion of said tagg table;

naming a relevant portion of said source material by means of a 'name' attribute in a tagg; and navigating said tagg table by selecting either a portion of said synchronized transcript or a portion of said source material.

8. The method of claim 7, further comprising the step of exporting at least a portion of said tagg table to a software application in a standardized markup language.

9. The method of claim 7, wherein the tagg table is displayed in a fourth pane within the viewer window.

10. The method of claim 9, wherein the first pane, the second pane, the third pane, and the fourth pane are simultaneously viewable within distinct quadrants of the viewer window.

11. The method of claim 7, wherein the tagg table is sortable by identifying detail.

12. The method of claim 11, wherein the identifying details include author of the transcribed segment, date and time the segment was transcribed, segment of the source material corresponding to the segment, beginning time code for the segment, ending time code for the segment, or any combination thereof.

13. A computer-implemented method of working with source material and transcripts of the source material, the method comprising the steps of:

displaying a client project list in a first pane within a viewer window, wherein all projects within the client project list are initially loaded, which permits a client to select a new project from the client project list without the viewer window being reloaded;

selecting a particular project to view from the client project list;

displaying a source material player in a second pane within the viewer window;

displaying a transcript for the particular project in a third pane within the viewer window;

creating a comment regarding a portion of the source material or a portion of the transcript;

saving the comment to a tagg table; and displaying the tagg table in a fourth pane within the viewer window, wherein the first pane, the second pane, the third pane, and the fourth pane are simultaneously viewable within the viewer window, and further wherein the source material, the transcript, and the tagg table are synchronized and each is navigable by the others.

14. The method of claim 13, wherein the viewer window is accessible by any number of users who can view the source material, edit the transcript, and create comments simultaneously.

* * * * *